(12) United States Patent
Nissen

(10) Patent No.: US 11,231,020 B2
(45) Date of Patent: Jan. 25, 2022

(54) POWER GENERATION PROCESS

(71) Applicant: Saltkraft ApS, Sønderborg (DK)

(72) Inventor: Steen Søndergaard Nissen, Ellicott City, MD (US)

(73) Assignee: SALTKRAFT APS, Sønderborg (DK)

(*) Notice: Subject to any disclaimer, the term of this patent is extended or adjusted under 35 U.S.C. 154(b) by 24 days.

(21) Appl. No.: 16/630,151

(22) PCT Filed: Jul. 11, 2018

(86) PCT No.: PCT/EP2018/068807
§ 371 (c)(1),
(2) Date: Jan. 10, 2020

(87) PCT Pub. No.: WO2019/011992
PCT Pub. Date: Jan. 17, 2019

(65) Prior Publication Data
US 2020/0166023 A1 May 28, 2020

(30) Foreign Application Priority Data
Jul. 12, 2017 (GB) .................................. 1711238

(51) Int. Cl.
*F03G 7/00* (2006.01)
*B01D 61/36* (2006.01)
(Continued)

(52) U.S. Cl.
CPC ............ *F03G 7/005* (2013.01); *B01D 61/364* (2013.01); *C02F 1/445* (2013.01); *F03G 7/04* (2013.01)

(58) Field of Classification Search
CPC ......... F03G 7/005; F03G 7/04; B01D 61/364; C02F 1/445; Y02E 10/30; Y02E 10/10
(Continued)

(56) References Cited

U.S. PATENT DOCUMENTS

| 4,099,381 A | 7/1978 | Rappoport |
| 4,193,267 A * | 3/1980 | Loeb .................... H01M 8/227 |
| | | 60/649 |

(Continued)

FOREIGN PATENT DOCUMENTS

| AU | 2007319995 | 5/2008 |
| CN | 1853044 | 10/2006 |

(Continued)

OTHER PUBLICATIONS

Notification of Transmittal of the International Search Report and Written Opinion of the International Search Authority—the European Patent Office—dated Oct. 15, 2018 for PCT/EP2018/068807, 14 pages.

(Continued)

*Primary Examiner* — Hoang M Nguyen
(74) *Attorney, Agent, or Firm* — Jackson Walker LLP; Christopher J. Rourk

(57) ABSTRACT

A process for generating power from a warm saline steam (1) obtained from geothermal sources. The process involves extracting a warm saline stream (1) from an underground geothermal formation (2), reducing the temperature of the saline stream (1) by passing the stream through a thermal power unit (5) in which thermal energy present in the stream is extracted. The process also involves converting latent osmotic energy present in the stream into electricity by passing the stream through an osmotic power unit (7) comprising a semi-permeable membrane (8). The output stream (13) derived from passage through the osmotic power unit is injected into a second, different underground formation.

19 Claims, 6 Drawing Sheets

(51) Int. Cl.
*C02F 1/44* (2006.01)
*F03G 7/04* (2006.01)

(58) Field of Classification Search
USPC .......................... 60/649, 673, 641.2–641.4
See application file for complete search history.

(56) References Cited

U.S. PATENT DOCUMENTS

| | | | |
|---|---|---|---|
| 5,029,444 | A | 7/1991 | Kalina |
| 7,857,978 | B2 | 12/2010 | Jensen et al. |
| 2002/0178723 | A1 | 12/2002 | Bronicki et al. |
| 2009/0032446 | A1 | 2/2009 | Wiemers et al. |
| 2009/0261040 | A1 | 10/2009 | Pruet |
| 2010/0024423 | A1 | 2/2010 | McGinnis et al. |
| 2010/0043640 | A1 | 2/2010 | Kelly |
| 2010/0071366 | A1 | 3/2010 | Klemencic |
| 2010/0140162 | A1 | 6/2010 | Jangbarwala |
| 2010/0192575 | A1 | 8/2010 | Mi-Mayahi et al. |
| 2010/0282656 | A1 | 11/2010 | Cath et al. |
| 2011/0044824 | A1 | 2/2011 | Kelada |
| 2011/0046074 | A1 | 2/2011 | Kumar et al. |
| 2011/0272166 | A1 | 11/2011 | Hunt |
| 2012/0117967 | A1 | 5/2012 | Loveday et al. |
| 2012/0267307 | A1 | 10/2012 | McGinnis |
| 2013/0001162 | A1 | 1/2013 | Yangali-Quintanilla et al. |
| 2013/0232973 | A1 | 9/2013 | McBay |
| 2013/0318870 | A1 | 12/2013 | Lim |
| 2014/0026567 | A1 | 1/2014 | Paripati et al. |
| 2014/0102095 | A1 | 4/2014 | Shim et al. |
| 2014/0138313 | A1 | 5/2014 | Sato |
| 2014/0138956 | A1 | 5/2014 | Sano et al. |
| 2014/0319056 | A1 | 10/2014 | Fuchigami et al. |
| 2015/0352497 | A1 | 12/2015 | Sakai et al. |
| 2015/0369521 | A1 | 12/2015 | Buscheck et al. |
| 2018/0135604 | A1* | 5/2018 | Nissen .................... F03G 7/005 |

FOREIGN PATENT DOCUMENTS

| | | |
|---|---|---|
| CN | 103547798 | 1/2014 |
| CN | 203505325 | 4/2014 |
| EP | 1885477 B1 | 2/2008 |
| EP | 2305368 | 4/2011 |
| EP | 2693050 | 2/2014 |
| FR | 3009613 | 2/2015 |
| JP | 2014061487 | 4/2014 |
| JP | 2014117653 | 6/2014 |
| WO | 2002062708 | 8/2002 |
| WO | 2004011600 | 2/2004 |
| WO | 2005017352 | 2/2005 |
| WO | 2005080750 | 9/2005 |
| WO | 2007033675 | 3/2007 |
| WO | 2010065791 | 6/2010 |
| WO | 2010091078 | 8/2010 |
| WO | 2010108872 | 9/2010 |
| WO | 2011132427 | 10/2011 |
| WO | 2012133661 | 4/2012 |
| WO | 2012140659 | 10/2012 |
| WO | 2013033082 | 3/2013 |
| WO | 2013043118 | 3/2013 |
| WO | 2013090901 | 6/2013 |
| WO | 2013164541 | 11/2013 |
| WO | 2014015307 | 1/2014 |
| WO | 2014126925 | 8/2014 |
| WO | 2015/058109 | 4/2015 |
| WO | 2015104957 | 7/2015 |
| WO | 2016037999 | 3/2016 |
| WO | 2017149101 | 9/2017 |

OTHER PUBLICATIONS

Notification of Transmittal of the International Preliminary Report on Patentability dated Jan. 14, 2020 for International Application No. PCT/EP2018/068807 enclosing the Written Opinion of the International Search Authority—the European Patent Office—dated Oct. 15, 2018 for PCT/EP2018/068807, 7 pages.

Search Report dated Nov. 28, 2017 from the United Kingdom Intellectual Property Office for Application No. GB1711238.4, 3 pages.

Cohen-Tanugi, et al., "Water Desalination Across Nanoporous Graphene", American Chemical Society, 2012, pp. 3602-3608.

Helfer, et al., "Osmotic Power with Pressure Retarded Osmosis: Theory, Performance and Trends—a Review", Journal of Membrane Science, 453, 2014, pp. 337-358.

Lin, et al., "Hybrid Pressure Retarded Osmosis—Membrane Distillation System for Power Generation from Low-Grade Heat: Thermodynamic Analysis and Energy Efficiency", American Chemical Society, 2014, pp. 5306-5313.

McGinnis, et al., "A novel amonia-carbon dioxide osmotic heat engine for power generation", Journal of Membrane Science, 305, 2007, pp. 13-19.

O'Hern, et al., "Selective Ionic Transport Through Tunable Subnanometer Pores in Single-Layer Graphene Membranes", American Chemical Society, 2014, pp. 1234-1241.

* cited by examiner

POWER GENERATION PROCESS

RELATED APPLICATIONS

The present application claims benefit of and priority to PCT/EP2018/068807, filed Jul. 11, 2018, which claims priority to and benefit of Great Britain Patent Application No. 1711238.4, filed Jul. 12, 2017, each of which is hereby incorporated by reference for all purposes, as if set forth herein in its entirety.

FIELD OF THE INVENTION

This invention relates to a power generation process. Specifically, it relates to the generation of power from warm saline streams obtained from geothermal sources.

BACKGROUND OF THE INVENTION

Much effort is currently being directed towards novel and renewable sources of energy which do not rely on fossil fuels. Possible renewable energy sources that have been identified include geothermal energy and latent osmotic energy and various schemes for the production of electricity or heat from these sources have been suggested.

One area of research for extracting latent osmotic energy is the process known as pressure retarded osmosis (PRO). In this process, a semipermeable membrane is used to separate a less concentrated solution from a more concentrated solution. The membrane causes solvent to pass from the less concentrated solution (with low osmotic pressure) to the more concentrated solution (with high osmotic pressure) by osmosis, and this leads to an increase in pressure on the side of the membrane to which the solvent diffuses due to the increased volume in the confined space. This pressure can be harnessed to generate electricity. A small number of PRO plants are in operation around the world, and these generally use differences in salinity as the driver for osmosis, typically using fresh water from a river or lake as the feed stream for the less concentrated solution, and sea water for the more concentrated solution. Helfer et al, J. Membrane Sci. 453 (2014) 337-358 is a review article describing PRO.

WO2016/037999 discloses a process for the generation of electricity comprising extracting a warm saline stream from a geothermal formation, and (a) converting thermal energy present in said stream into electricity and (b) converting latent osmotic energy present in said stream into electricity by passage through an osmotic power unit. In addition to the increase in power generation which may be expected from extracting two different types of energy from the same source, WO 2016/037999 discusses how the two energy extraction processes may complement each other to reduce inefficiencies in each process caused by certain characteristics of warm saline streams from geothermal formations, including high salt content of such streams causing fouling of the thermal power unit and high temperatures of such streams reducing the operating efficiency and/or lifetime of commercially available osmotic membranes.

Osmotic power generation processes such as those described in WO 2016/037999 and elsewhere, rely on the difference in salinity between a high-salinity stream (for example a warm saline stream from a geothermal formation) and an aqueous feed stream of lower salinity. This lower salinity stream is typically sea water, fresh or brackish water obtained, for example, from a river or a lake; waste water obtained from an industrial or municipal source; or potentially boiler condensate from a traditional power plant. The economics of a PRO process are likely to be particularly favorable when a geothermal well is located adjacent a sea, river or lake, with sourcing of the necessary streams and disposal of the waste streams both being easy and cheap. However, it would be advantageous to identify methods facilitate the use of such a process when such water sources are not readily available in order to expand the range of locations in which osmotic power generation can be used on a commercial basis. Thus, it would be advantageous to identify alternative sources for the aqueous feed stream, and/or reduce the amount of fresh water required for a given amount of power generation.

While the salinity of the high-salinity stream may be reduced by passage through the osmotic power unit, salt levels (or the levels of other contaminants) may still be significant and therefore, once extracted from the geothermal formation such streams must be disposed of carefully in order to avoid negative environmental impact. Again, disposal may be further complicated when a power system is located distant from a large body of water such as a sea, river or lake. Accordingly, it would be advantageous to identify methods of disposing of the waste streams produced by an osmotic power generation process and/or reducing the amount of waste generated.

The present invention seeks to mitigate the above-mentioned problems. Alternatively or additionally, the present invention seeks to provide an improved electricity generation process.

SUMMARY OF THE INVENTION

In one aspect, the present invention provides a process for the generation of power, the process comprising the steps of: extracting a warm saline stream from a first underground formation, the first underground formation being a geothermal formation; converting latent osmotic energy present in said stream into electricity by passage through an osmotic power unit in which said stream is passed over one side of a semi-permeable membrane which permits the passage of water but not the passage of salts, a low salinity stream derived from an aqueous feed stream being passed over the other said of said membrane; and reducing the temperature of said warm saline stream before said stream enters the osmotic unit by passage through a thermal power unit in which thermal energy present in said stream is extracted, and wherein an output stream derived from said saline stream after passage through the osmotic power unit is injected into a second, different, underground formation.

In another aspect, the present invention provides a power generation system comprising: a first inlet connection to a warm saline stream extracted from a first underground formation; an osmotic power unit arranged to generate electricity, for example through Pressure Retarded Osmosis (PRO), using the difference in salinity between a high-salinity input stream and a low-salinity input stream; a thermal power unit arranged to extract thermal energy from the warm saline stream thereby producing a cooled output stream; and a first outlet connection to a second, different underground formation, wherein the system is arranged such that the cooled output stream of the thermal power unit is passed to the osmotic power unit for use as the high-salinity input stream, and the waste stream derived from the high-salinity input stream following passage through the osmotic power unit is passed to the second underground formation via the first outlet.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
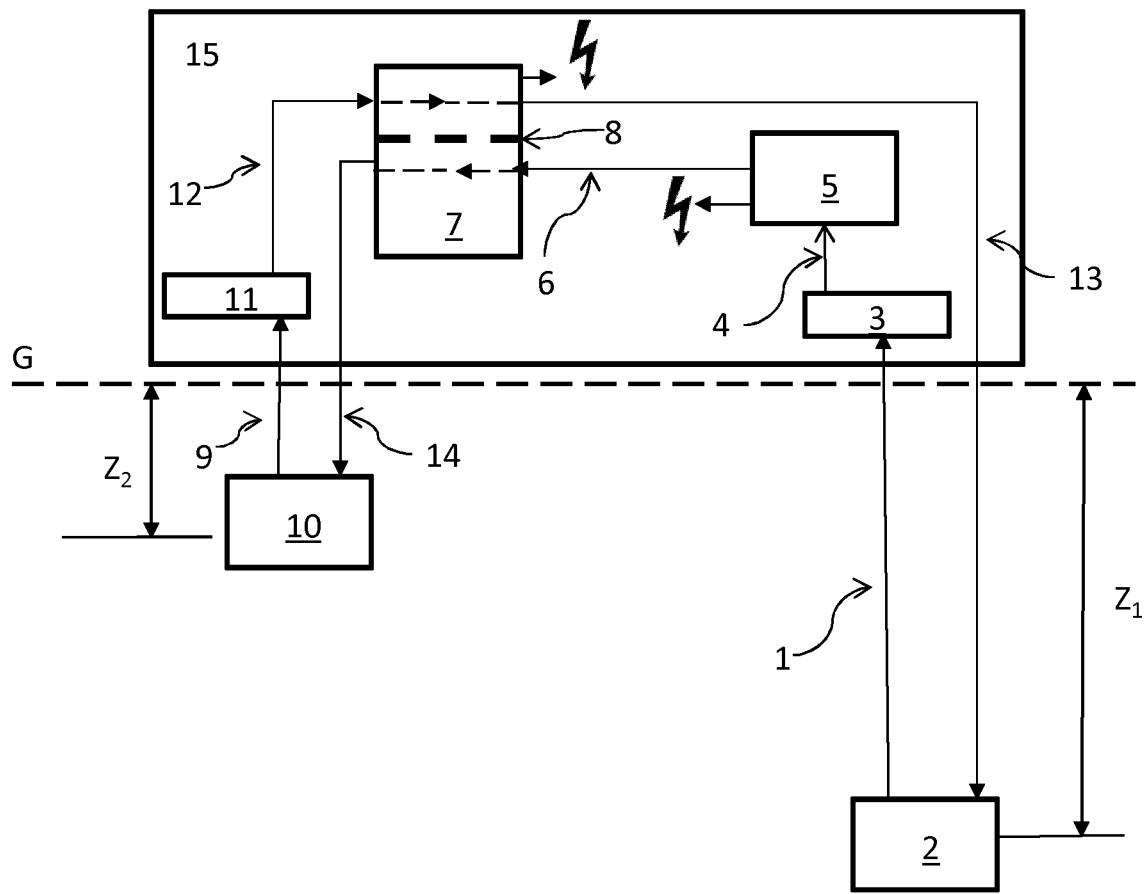
FIG. 1 shows a schematic view of a power generation process according to a first example embodiment of the invention.

As discussed above, in one aspect of the invention there is provided a process for the generation of power, the process comprising the steps of: extracting a warm saline stream from a first underground formation, the first underground formation being a geothermal formation; converting latent osmotic energy present in said stream into electricity by passage through an osmotic power unit in which said stream is passed over one side of a semi-permeable membrane which permits the passage of water but not the passage of salts, a low salinity stream derived from an aqueous feed stream being passed over the other said of said membrane; and reducing the temperature of said warm saline stream before said stream enters the osmotic unit by passage through a thermal power unit in which thermal energy present in said stream is extracted, wherein an output stream derived from said saline stream after passage through the osmotic power unit is injected into a second, different, underground formation.

The process of the present invention inserts the reduced salinity exit stream from the osmotic unit into an underground formation which may facilitate the use of osmotic power generation in locations where there is no suitable lake or river into which the output streams of the process can be inserted.

The process may comprise extracting the aqueous feed stream from the second underground formation. The process may comprise inserting the output stream derived from the warm saline stream after passage through the osmotic power unit into the underground formation from which the aqueous feed stream is extracted. Thus, the method may comprise extracting the aqueous feed stream from the second underground formation. This may reduce the amount of water required by the process as the portion of water from the low salinity stream that crosses the membrane into the saline stream is the returned to the second underground formation. Thus, the process may facilitate the use of osmotic power generation in locations where the supply of fresh water is limited.

The water contained in the second underground formation may be unsuitable for use as drinking water. For example, the aqueous feed stream extracted from the second underground formation may contain one or more contaminants that render it unsuitable for use as drinking water. Using contaminated water in the osmotic power generation process may facilitate the use of osmotic power generation in locations where the supply of fresh drinking water is limited.

The second underground formation may be an aquifer. An aquifer may be defined as an underground water-bearing formation. An aquifer may comprise a permeable layer, for example a layer of permeable rock, rock fractures or unconsolidated materials (for example gravel, sand, or silt), from which groundwater can be extracted. The aquifer may be located below drinking water depth. For example, the aquifer may be located more than 50 m underground. The aquifer may be located in a region extending between 50 m and 400 m underground, for example between 100 m and 200 m underground. The water contained within the aquifer may be unsuitable for use as drinking water. For example, the water contained within the aquifer may comprise one or more contaminants that render the water unsuitable for use as drinking water. The temperature of the water in the aquifer may be less than 25° C., for example between 15° C. and 5° C., for example between 12° C. and 8° C.

The process may comprise injecting an output stream derived from said low salinity stream after passage through the osmotic power unit (a low salinity exit stream or aqueous exit stream) into an underground formation. The low salinity exit stream may be injected into a third, different, underground formation. The low salinity exit stream may be injected in the first, geothermal, underground formation. Thus, the process may comprise:

extracting a warm saline stream from a first underground formation (e.g. the geothermal formation), passing said stream through a thermal power unit and an osmotic power unit and inserting the resulting reduced salinity exit stream into a second, different formation (e.g. an aquifer); and extracting an aqueous feed stream from the second formation (e.g. the aquifer), passing the feed stream through an osmotic power unit and inserting the resulting aqueous exit stream into the first underground formation (e.g. the geothermal formation).

The process may comprise two counter-current streams; a first stream passing from the (high salinity) geothermal formation to the (low salinity) aquifer and a second stream passing from the (low salinity) aquifer to the (high salinity) geothermal formation. Each stream may pass via the osmotic power unit. In this way, the process of the present invention may reduce the amount of fluid extracted from or returned to the surrounding environment. In some circumstances, the flow rates into and out of the various underground formation may balance such that the streams may be seen as forming a closed loop. That is to say that only fluid from the first, second and third (if present) underground formations is used in the process, and all fluid used in the process is returned to one of the first, second and third (if present) underground formations.

The second underground formation may be spaced apart from the geothermal formation. The second underground formation may be an aquifer. The second underground formation may be separate from the geothermal formation in the sense that significant quantities of water would not naturally pass between the second formation and the geothermal formation under normal circumstances.

In the case that the thermal power unit is located on the flow path between the geothermal formation and the inlet to the osmotic power unit, the output of the thermal power unit is a cooled saline stream, which is passed to the osmotic power unit. The cooler (in comparison to the warm stream from the geothermal formation) saline stream may be better suited to the osmotic power generation process than the warm stream obtained from the geothermal formation. For example, the cooler saline stream may result in an increase in the efficiency of the osmotic membrane and/or the lifetime of the membrane.

If the osmotic power unit is located on the flow path between the geothermal formation and the inlet to the thermal power unit, the output of the osmotic power unit is a warm stream of reduced salinity, which is passed to the thermal power unit. The reduction in the salinity of the warm stream which occurs during the osmotic power generation process may mean that the precipitation of solid salts(s) as the temperature drops during the thermal power generation process is reduced thereby reducing fouling and/or increasing the efficiency of the thermal generation process.

For convenience the process of extracting thermal energy present in the warm saline stream extracted from a geothermal formation may be referred to hereafter as step (a). The process of converting latent osmotic energy present in said stream into electricity may be referred to hereafter as step (b).

The process of the invention uses a warm saline stream obtained from the geothermal formation. The warm stream is extracted from the ground using conventional drilling techniques and is generally subject to any necessary pre-treatment steps prior to carrying out steps (a) and (b). For example, filtration to remove solid material may be necessary, as might other conventional processes depending on the exact nature of the warm stream. Some geothermal streams have a very high salt content, and if step (a) is to be carried out prior to step (b), it may be necessary to reduce the salt content prior to carrying out step (a) to prevent precipitation of solid salt(s) as the temperature drops.

Any suitable means may be used to extract thermal energy from the warm saline stream. The stream may be passed through a thermal power unit comprising a heat exchanger. The stream may be passed through thermal a power unit comprising a steam generator. Extracting thermal energy from the warm saline stream may comprise converting the thermal energy into electricity or heat.

The process may comprise extracting thermal energy from the warm saline stream in the form of heat by passing the stream through a thermal power unit comprising a heat exchanger. The process may comprise using the heat so produced in a district heating system. For example, the thermal power unit may be configured to transfer heat from the warm saline stream to the circulating fluid of a district heating system. The use of a heat exchanger is preferred in many circumstances, especially where the initial temperature of the warm saline stream emerging from the geothermal formation is less than 150° C.

The process may comprise converting thermal energy from the warm saline stream into electricity by passing the warm saline stream through a thermal power unit comprising a steam generator. Particularly where the stream is of very high temperature and high pressure, steam from the geothermal stream may be used directly to drive the steam generator. Conventional means of handling warm streams which may be in either the liquid phase or the gaseous phase or both are well known, and any such means may be used in the present invention.

Preferably a geothermal formation is chosen which yields a warm saline stream having a temperature of at least 45° C., preferably at least 55° C., for example at least 70° C. The salt content may be anything up to saturation. Preferably the salt content is at least 10% wt, preferably at least 15% wt, especially at least 20% wt. It will be understood that saline streams from geothermal sources may contain a wide variety of dissolved salts, with a preponderance of sodium chloride, and that "salt content" refers to total salt content. The exact nature of the salt(s) present in such streams is not important. Similarly, the terms high(er)-salinity and low(er)-salinity are used herein to refer to streams having a corresponding "salt content"—the exact nature of the salt(s) present in such streams is not important.

For step (a), a warm stream is passed through a thermal power unit, for example one or more heat exchangers and/or steam generators, to extract thermal energy which is converted into electricity or heat. Any type of conventional power generation system may be used. If step (a) is carried out before step (b), the output from step (a) is a cooled saline stream, and this is used as the feed for step (b). If step (a) is carried out after step (b), the output from step (a) will be a waste stream which may be inserted into an underground formation.

Step (b) is powered by osmosis, and converts latent osmotic energy into electricity. An osmotic power unit is a unit which converts latent osmotic energy into electricity. Any suitable osmotic power unit may be used in the process of the present invention. The key feature of such a unit is the presence of a semi-permeable membrane which permits the passage of water but not of dissolved salt(s). Such membranes are commercially available, and any suitable membrane may be used. In addition, novel types of membrane, for example membranes based on a lipid or amphiphilic polymer matrix containing aquaporins, which are proteins which permit the passage of water but no other substance, may be used. Such membranes are described in for example WO 2004/011600, WO 2010/091078, US 2011/0046074 and WO 2013/043118. Other novel types of membrane include graphene-based membranes, for example those described by Cohen-Tanugi et al, Nano Lett. 2012, 12(7), pp. 3602-3608 and O'Hern et al, Nano Lett. 2014, 14(3), pp. 1234-1241. More than one membrane may be present, and combinations of different types of membranes may be used. Thus the osmotic power unit may contain more than one osmosis unit each containing a semi-permeable membrane. As well as at least one membrane, an osmotic power unit will include means for converting pressure or flow generated by osmosis into electricity. Typically this means will be a turbine connected to a generator, but any suitable means may be used.

As well as the saline feed stream originating from the geothermal formation, step (b) requires a feed stream which is an aqueous stream having lower salinity than the saline stream originating from the geothermal formation. Throughout this specification, unless the context requires otherwise, "lower salinity" should be understood to include zero salinity.

The initial inputs to step (b) are thus one higher salinity stream (the saline stream), and one lower salinity stream. After passage over a membrane, the first stream (initial higher salinity) will be reduced in salinity, while the second stream (initial lower salinity) will be increased in salinity as a result of the water moving across the membrane. The output streams from a first pass over the membrane will both have lower salinity than the original warm saline stream, and higher salinity than the original lower salinity stream—at equilibrium, the two streams would have equal salinity, but this is rarely achieved in practice. Therefore, either output stream can be reused as either the first stream or the second stream for a second pass over the original membrane, or as either the first stream or the second stream over a second membrane. These reused streams may be used alone, or merged with other input streams. Multiple cycles can be used to increase the overall efficiency of the process. As long as an outgoing stream from an osmosis unit has higher salinity than the initial input stream of lower salinity, it is possible to operate an additional osmosis unit. The optimal number of cycles will depend on the initial content of the streams, the efficiency of the membranes, and the flow rates selected.

The input to step (a) is a warm saline stream (which optionally has been subjected to one or more pre-treatment steps). The output from step (a) may be referred to as a cool saline stream. It will be appreciated that the term "cool" refers to the temperature of the saline stream with respect to the "warm" saline stream.

The inputs to step (b) are a high-salinity stream and a low-salinity stream. The outputs from step (b) are (i) a reduced-salinity exit stream derived from the high-salinity stream following passage over one or more membranes and (ii) an aqueous exit stream derived from the low-salinity stream following passage over one or more membranes.

If step (b) is carried out after step (a), the ultimate output from step (b) will be a waste stream from the first side of the membrane and a waste stream from the second side of the membrane, and these streams may be handled separately or merged. If step (b) is carried out before step (a), the ultimate output from step (b) will be one stream derived from the original warm saline stream which now has reduced salinity but which still retains heat and is at a temperature above ambient temperature. This stream is then used as the feed for step (a).

After step (a) and (b), the process comprises injecting (at least part of) an exit stream derived from the warm saline stream into the second underground formation. Thus, the method comprises injecting (at least part of) a cool reduced-salinity exit stream into the second underground formation. The exit stream is injected into the ground using conventional techniques.

The process may comprise extracting a warm saline stream from more than one geothermal formation and combining said streams to provide the high salinity stream for use in the osmotic power unit. Each stream, or a combined stream derived from each stream may pass through a thermal power unit, for example the same thermal power unit. The process may comprise extracting an aqueous feed stream from more than one aquifer and combining said stream to provide the low salinity stream for use in the osmotic power unit. Using multiple formations may facilitate the use of formations that otherwise have too low a flow rate for use in economically viable power generation.

At least part, for example all, of the reduced-salinity exit stream output by the osmotic power unit may be injected into the ground through a re-injection well. The re-injection well may be made using conventional techniques.

The efficiency of the process of the invention will depend upon the initial temperature and pressure of the warm saline stream, and also upon the quantity and nature of the salt(s) the stream contains. Another key feature determining the efficiency of the process will be the performance of the semi-permeable membrane, and optimization depends on a combination of two factors: the flux of water obtainable through the membrane, and the efficiency with which the membrane can exclude salts. The use of multiple osmosis units as described above can also affect overall process efficiency.

In one aspect, the present invention may provide a power generation system. The power generation system may comprise a first inlet connection to a warm saline stream extracted from a first underground formation. The power generation system may comprise an osmotic power unit arranged to generate electricity, for example through Pressure Retarded Osmosis (PRO), using the difference in salinity between a high-salinity input stream and a low-salinity input stream. The power generation system may comprise a thermal power unit arranged to extract thermal energy from the warm saline stream thereby producing a cooled output stream. The power generation system may comprise a first outlet connection to a second, different underground formation. The system may arranged such that the cooled output stream of the thermal power unit is passed to the osmotic power unit for use as the high-salinity input stream. The system may be arranged such that the waste stream derived from the high-salinity input stream following passage through the osmotic power unit is passed to the second underground formation via the first outlet.

The power generation system may comprise a second outlet connection to an underground formation. The system may be configured such that the aqueous exit stream is passed to the second outlet connection. The second outlet connection may be a connection to an underground formation, for example the first, geothermal, underground formation. The second outlet connection may be a connection to a third, different, underground formation.

The power generation system may comprise a second inlet connection to an aqueous feed stream. The second inlet connection may be a connection to the second underground formation, for example an aquifer. Alternatively, the second connection may be a connection to a third, different, underground formation.

The power generation system may comprise a connection to two or more geothermal formations from which a warm saline stream can be extracted, and/or two or more underground formations from which an aqueous feed stream can be extracted.

The power generation system may comprise one or more pumps to pressurize an exit stream for injection into an underground formation.

The thermal power unit may extract thermal energy from the warm saline stream to produce a cooled output stream. The system may be arranged such that the cooled output stream of the thermal power unit is passed to the osmotic power unit for use as the high-salinity input stream. Alternatively, the system may be arranged such that the reduced salinity output stream derived from the warm saline stream after passage through the osmotic power unit is passed the thermal power unit for heat extraction.

The thermal power unit may be arranged to generate electricity or heat. The system may further comprise a connection to a district heating system. A district heating system may be configured to distribute heat generated in a centralized location to several different buildings or areas. The power generation system may be arranged such that the thermal power unit provides thermal energy extracted from the warm input stream to said district heating system. Thus the thermal power unit may be configured to heat the fluid circulating in the district heating system.

The system may further comprise a connection to one or more reinjection wells. Either of the first or second outlet connections may be in fluid communication with a reinjection well. A reinjection well may be arranged to inject a stream into an underground formation. The system may be arranged such that at least part of the reduced-salinity output stream is passed to the reinjection well for injection into an underground formation.

The osmotic power unit and/or the thermal power unit may be located above ground. The power generation system (for example the osmotic power unit and/or the thermal power unit) may be mounted on a mobile platform, for example a road vehicle for example a tuck, heavy goods vehicle (HGV) or similar vehicle.

In another aspect, there may be provided a process for the generation of power using two or more power generation systems. The process for the generation of power described above may be carried out by a first power generation system. Thus, the process at the first power generation system may comprise:

extracting a warm saline stream from a first underground formation, the first underground formation being a geothermal formation, converting latent osmotic energy present in said stream into electricity by passage through an osmotic power unit in which said stream is passed over one side of a semi-permeable membrane which permits the passage of water but not the passage of salts, a low salinity stream derived from an aqueous feed stream being passed over the other said of said membrane, and reducing the temperature of said warm saline stream before said stream enters the osmotic unit by passage through a thermal power unit in which thermal energy present in said stream is converted into electricity or heat, and wherein an output stream derived from said saline stream after passage through the osmotic power unit is injected into a second, different, underground formation. The process of the first power generation system may have any of the features described above.

The first and second power generations systems may extract fluid from or inject fluid into the same underground formation. Linking up the power systems in this way may minimise the contamination of the environment and/or allow fluid to be drawn from formations having lower flow rates. It may be that both power generation systems inject a stream into the same underground formation, both power generation systems extract a stream from the same underground formation, or one of the first and second systems injects a stream into the underground formation while the other of the first and second systems extracts a steam from said formation.

The process at the second power generation system may comprise extracting an aqueous feed stream from the same underground formation as the first power generation system, for example the second underground formation. The first and second power generations systems may extract the low salinity feed stream from the same formation, for example the same aquifer. Thus, at the second system the process may comprise:

extracting a warm saline stream from an underground formation, the underground formation being a geothermal formation, converting latent osmotic energy present in said stream into electricity by passage through an osmotic power unit in which said stream is passed over one side of a semi-permeable membrane which permits the passage of water but not the passage of salts, a low salinity stream derived from an aqueous feed stream being passed over the other said of said membrane, and reducing the temperature of said warm saline stream before said stream enters the osmotic unit by passage through a thermal power unit in which thermal energy present in said stream is converted into electricity or heat, and wherein the aqueous feed stream is extracted from the second underground formation.

The process at the second power system may comprise extracting a warm saline stream from the same geothermal formation as the first power system, or a different geothermal formation to that used by the first power system. The process at the second power system may comprise injecting an output stream derived from the saline stream after passage through the osmotic power unit into the same formations used by the first power system (for example the first or second underground formation), or a different formation.

The process may comprise one or both of the first and second power generation systems injecting an output an output stream derived from said saline stream after passage through the osmotic power unit into a third, different, formation.

Alternatively, the process at the second power system may comprise extracting an aqueous feed stream from a third, different, underground formation, for example an aquifer. The process at the second power system may further comprise inserting an aqueous exit stream into the second underground formation. Thus, the aqueous exit stream of the second system may be inserted into the underground formation into which the first system inserts its reduced-salinity exit stream. The process at the first system may comprise extracting an aqueous feed stream from the second underground formation. Thus, the first system may extract its aqueous feed stream from the formation into which the second system inserts its aqueous exit stream.

It will be apparent that further power systems may be included in such a system. Each further power generation system injecting or extracting fluid from an underground formation used by another power system. For example, a system with n power systems (1 to n), may use n+1 underground formations. The first (geothermal) formation having the highest temperature and salinity, the n+1 formation (for example an aquifer) having the lowest temperature and salinity. Thus, the closed loop discussed above may be formed across more than two underground formations, and more than two power systems such that the output from one system acts as the input for another system via an underground formation.

The first power generation system may be spaced apart from the second power system. Each of the two or more power systems may be spaced apart from the other power system. Each power system may have a connection to a regional and/or national power distribution network.

An osmotic power unit may contain more than one osmosis unit, each osmosis unit comprising a semipermeable membrane which permits the passage of water but not the passage of salt. The output from each osmosis unit will be a first outgoing stream from a first (initial higher salinity) side of the membrane and a second outgoing stream from a second (initial lower salinity) side of the membrane. These streams may be handled separately or at least partially merged.

The output from the osmotic power unit will be one or more output streams. Depending on the number of osmotic units in the osmotic power unit and the way the outgoing streams from each osmotic unit are handled the properties of these output streams may vary.

It will be appreciated that the steps of injecting the aqueous feed stream, extracting the saline stream and converting latent osmotic energy are carried out simultaneously.

The process may comprise a step of increasing the flow rate available from an underground formation, for example the first and/or second underground formation. The process may comprise increasing the flow rate by drilling non-vertically, for example substantially horizontally. The process may comprise drilling a first expansion bore at a first depth, and drilling a second expansion bore at a second, different, depth. The process may comprise drilling further bores at further, different, depths. The process of directional drilling is well known in the field of oil and gas, but the present invention recognizes that it may be used in the implementation of osmotic power generation in order to facilitate the management of the waste streams from the osmotic process. Increasing the capacity for fluid to flow into and out of the underground formation(s) in this way may reduce the amount of contamination of the external environment and/or increase the efficiency of power generation.

One example embodiment of the invention is illustrated schematically in FIG. 1. In FIG. 1, a warm saline stream 1 extracted from a geothermal formation 2 at a depth $Z_1$ of around 1200 m is passed through one or more pre-treatment steps 3 and the resulting stream 4 is passed to a heat exchanger 5. In the heat exchanger 5 thermal energy is extracted and ultimately converted to electricity by conventional means not shown, and the warm stream 4 is cooled and exits as cooled saline stream 6. Stream 6 is passed to osmotic power unit 7 where it is caused to flow at one side of a semi-permeable membrane 8 (denoted by a dashed line in FIG. 1) which permits passage of water but not of salts. An aqueous stream 9 which is of lower salinity that streams 1,4 and 6 is extracted from an aquifer 10 at a depth $Z_2$ of around 100 m. The aqueous stream 9 extracted from aquifer 10 includes contaminants that render it unsuitable for use as drinking water. Once extracted, the aqueous stream 9 is passed through one or more pre-treatment steps 11 and the resulting stream 12 is passed to osmotic power unit 7 where it is caused to flow at the other side of the semi-permeable membrane 8. Within osmotic power unit 7, water flows from stream 12 into stream 5 via the semi-permeable membrane causing an increase in pressure due to the increased volume in a confined space, and this excess pressure is ultimately converted to electricity by conventional means not shown. Output from the osmotic power unit 7 forms an aqueous exit stream 13 derived from the initial aqueous stream 12 (i.e. stream 12 minus the water that has flowed via the semi-permeable membrane 8) and a reduced salinity exit stream 14 derived from the cooled saline stream 6 (i.e. stream 6 plus the water that has flowed via the semi-permeable membrane 8). Some or all of reduced salinity exit stream 14 is injected into the aquifer 10 from which the aqueous stream 9 was extracted. Some or all of aqueous exit stream 13 is injected into the geothermal formation 2 from which the warm saline stream 1 was extracted. Pre-treatment steps 3, heat exchanger 5, pre-treatment steps 11 and osmotic power unit 7 are located within a power generation plant 15 situated above ground level, which is denoted by a dashed line labelled G in FIG. 1. Typical properties for the various streams are summarised in Table 1 below.

TABLE 1

Typical Stream Properties

| Stream | Flow rate (m³/hour) | Temperature (° C.) | % total salt content |
|---|---|---|---|
| Warm Saline Stream 1 | 100 | 70 | 15-20 |
| Cool Saline Stream 6 | 100 | 15 | 15-20 |
| Aqueous feed stream 9 | 100 | 15-20 | 0-1 |
| Aqueous exit stream 13 | 25 | 15 | 0-4 |
| Reduced salinity exit stream 14 | 175 | 15 | 8-11 |

Figure 2:
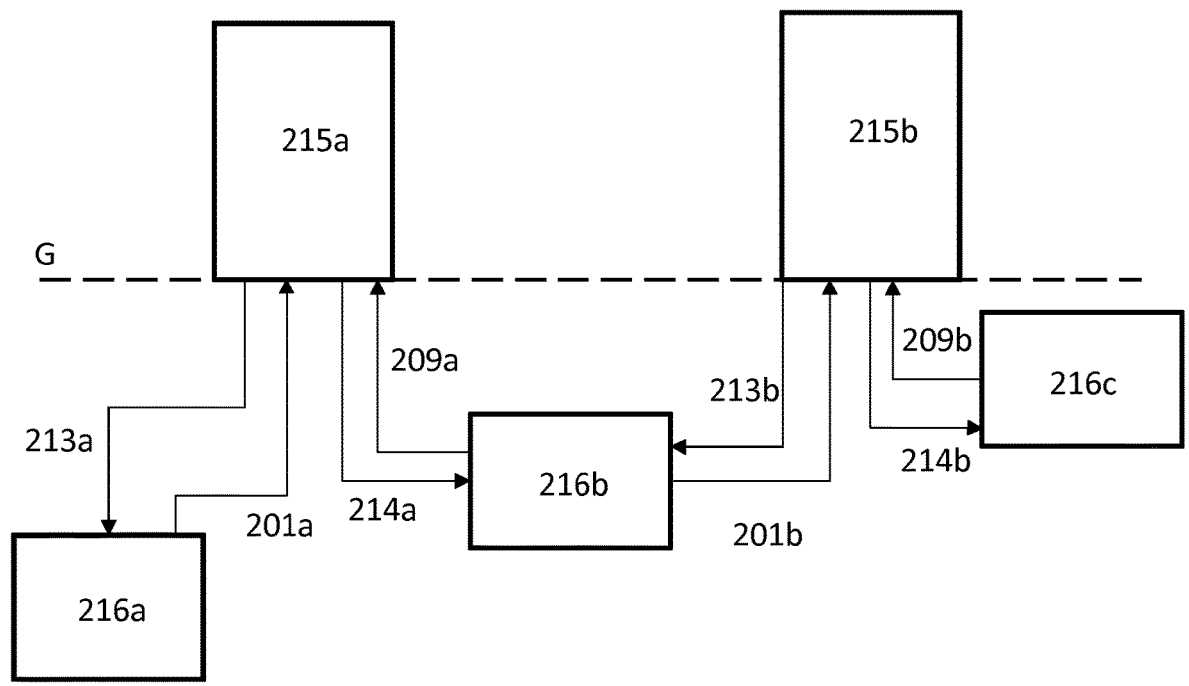
FIG. 2 shows a schematic view of a power generation system according to a second example embodiment of the invention.

FIG. 2 shows a variant of the system of FIG. 1. Like elements are denoted with like reference numerals. Only those elements of the FIG. 2 embodiment which differ from the FIG. 1 embodiment will be discussed here. The system of FIG. 2 comprises two power generation systems 215a and 215b, each power system 215a, 215b drawing fluid from and/or injecting fluid into at least one of three underground formations, 216a, 216b and 216c. The first underground formation 216a is a geothermal formation having high temperature $T_1$ and salinity $S_1$. The third underground formation 216c is an aquifer having low temperature $T_3$ and near-zero salinity $S_3$. The second underground formation 216b has a temperature $T_2$ lying between $T_1$ and $T_3$, and a salinity lying between $S_1$ and $S_3$. Each power system 215 of FIG. 2 contains all the elements of power system 15 of FIG. 1 but for clarity not all elements are included in FIG. 2.

The first power system 215a extracts a warm saline stream 201a from geothermal formation 216a. This is passed through pre-treatment steps 213a and heat-exchanger 205a to produce a cooled saline stream 205a for use in the osmotic power unit 207a of the first power system 215a. The reduced salinity exit stream 214a from power unit 207a is injected into the second underground formation 216b. The second power system 215b extracts a warm saline stream 201b from underground formation 216b, which passes through the osmotic power unit 207b as the cooled saline stream 205b to produce a reduce salinity exit stream 214b. The reduced salinity exit stream 214b from the second power system 215b is injected into the aquifer 216c. The second power system 216b draws an aqueous feed stream 209b from the aquifer 216c to pass over the other side of the membrane in osmotic power unit 207b, before being inserted, as aqueous exit stream 113b into the second underground formation 216b. The first power system 216a uses an aqueous feed stream 209a extracted from the underground formation 216b, which ultimately exits the system as aqueous exit stream 213a which is inserted into the geothermal formation 216a. The linking of the reservoirs in this way may mean power generation systems in accordance with the present embodiment release less contaminated fluid into the surrounding environment and/or may facilitate the use of underground formations that may not otherwise be suitable for use in osmotic/thermal power generation.

It will be appreciated that while a saline stream produced from the second underground formation 216b may have lower temperature and salinity that the warm saline stream from the first underground formation 216a, it may still be sufficient to produce power, particularly when the lower salinity of the aqueous stream 209b from the third underground formation 216c is taken into account. It will be further appreciated that this system may be used with more than two power generation systems 215. In other embodiments (not shown) the two power generation systems may only have one underground formation in common. For example, both power systems may draw an aqueous feed stream from the same low-salinity aquifer, but draw a warm saline stream from different geothermal formations.

Figure 3:
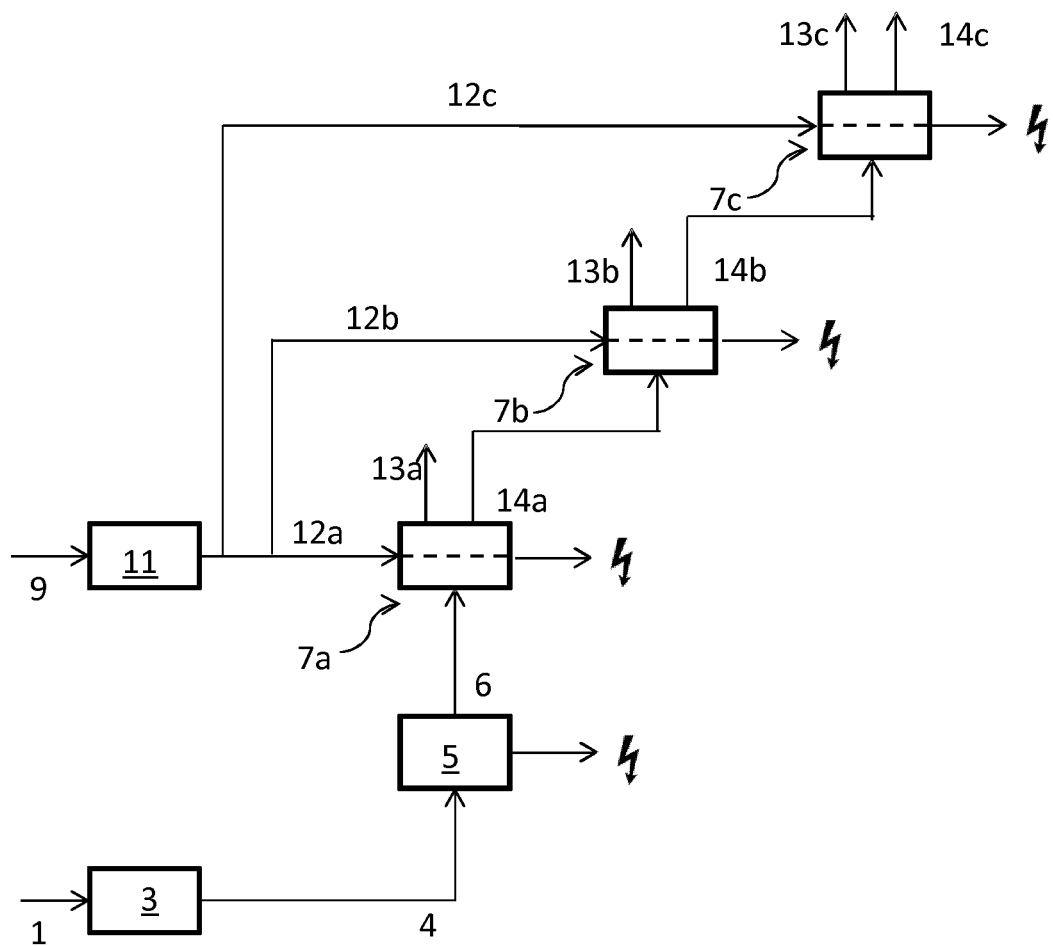
FIG. 3 shows a variant of the process of FIG. 1 in which multiple osmosis units are used.

FIG. 3 shows a variant of the process of FIG. 1 in which multiple osmosis units 7a, 7b and 7c are connected in series in a power generation system according to the invention. Like reference numerals denote like elements. Each osmosis unit 7a, 7b and 7c contains a semi-permeable membrane (not shown) which permits passage of water but not of salts. Original high saline stream 6 flows at one side of the semipermeable membrane, while lower salinity stream 12a flows at the other side. Output stream 14a from osmosis unit 6a, which has a salt content lower than that of original geothermal input streams 4 and 6, is fed to a second osmosis unit 7b where it is passed over one side of a semi-permeable membrane. A second input stream 12b of relatively low salinity water is obtained from original aqueous stream 9 after passage through one or more pretreatment steps 11. Although the difference in salinity between streams 14a and 12b is lower than the difference in salinity between streams 6 and 12a, there is still a difference in salinity, and electricity can be generated by osmosis. Output stream 14b from osmosis unit 7b, which has a salt content lower than that of original geothermal input streams 4 and 6, and also lower than stream 14a, is fed to a third osmosis unit 7c where it is passed over the other side of a semi-permeable membrane from a further input stream 12c of relatively low salinity water. Although the difference in salinity between streams 14b and 12c is lower than the difference in salinity between streams 6 and 12a, or between streams 14a and 12b, there is still a difference in salinity, and electricity can be generated by osmosis. Output streams from the process of FIG. 3 are aqueous exit streams 13a, 13b, 10c and 13c, and these streams may be disposed of by injecting these streams into the geothermal formation 2 from which the high salinity stream 1 is extracted. The reduced salinity exit stream 14c may be disposed of by injecting these stream into the aquifer 10, or another underground formation.

Figure 4:
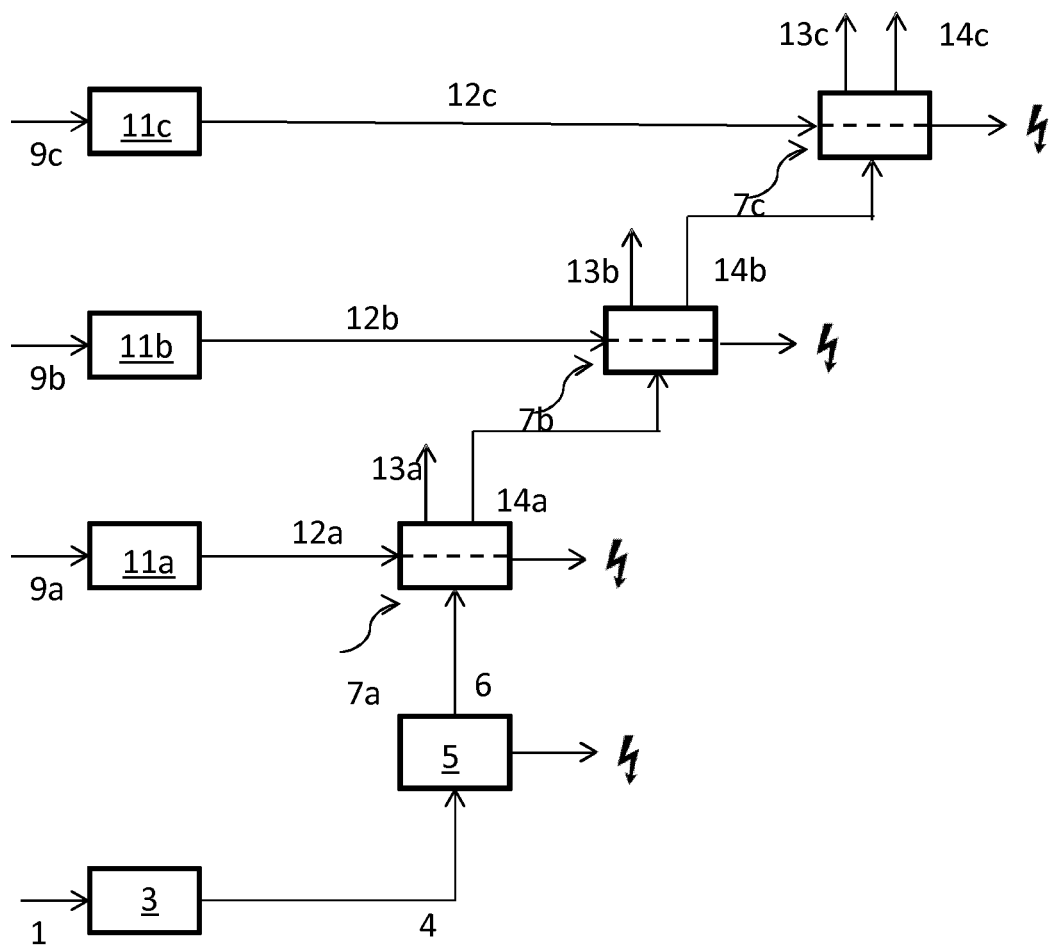
FIG. 4 shows a variant of FIG. 3 with alternative input streams.

FIG. 4 shows a variant of FIG. 3 in which input streams 12a, 12b and 12c of relatively low salinity water are provided as separate input streams 9a, 9b and 9c, each undergoing one or more pre-treatments steps 11a, 11b and 11c.

Figure 5:
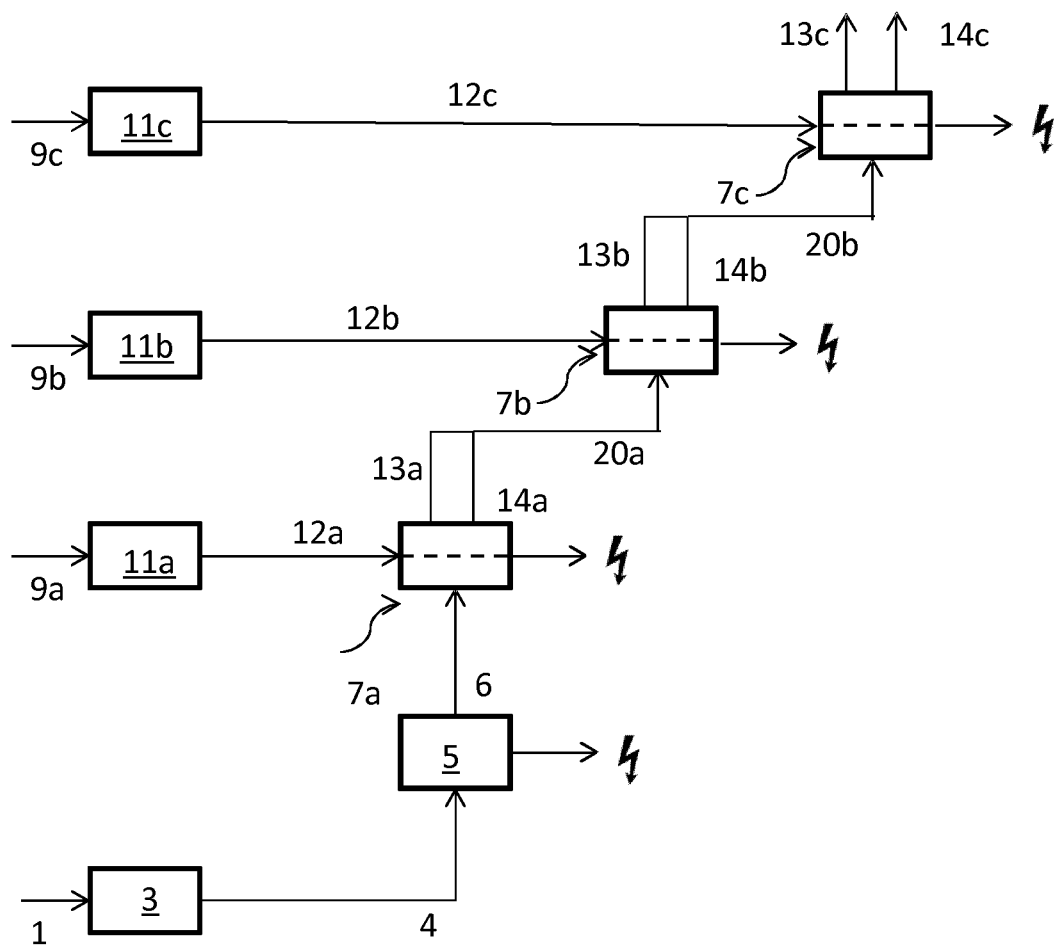
FIG. 5 shows a variant of FIG. 4 with alternative output streams.

FIG. 5 shows a variant of FIG. 4 in which output streams are handled in a different way. Outlet streams 13a and 14a from osmosis unit 7a are merged, and at least part of the merged stream is provided as input stream 20a to osmosis unit 7b. The merged stream 20a will have a salt content lower than that of original geothermal input streams 4 and 6, and although the difference in salinity between stream 20a and stream 12b is lower than the difference in salinity between streams 6 and 12a, there is still a difference in salinity, and electricity can be generated by osmosis. Similarly, outlet streams 13b and 14b from osmosis unit 7b are merged, and at least part of the merged stream is provided as input stream 20b to osmosis unit 7c.

It will be understood that FIGS. 3, 4 and 5 show an osmosis power unit consisting of 3 osmosis units each containing a semi-permeable membrane, but that any suitable number of units can be used, the choice being determined by a combination of technical and economic factors. In general, the higher the initial salinity of the warm saline stream 1, the higher the number of osmosis units which may be used.

Figure 6:
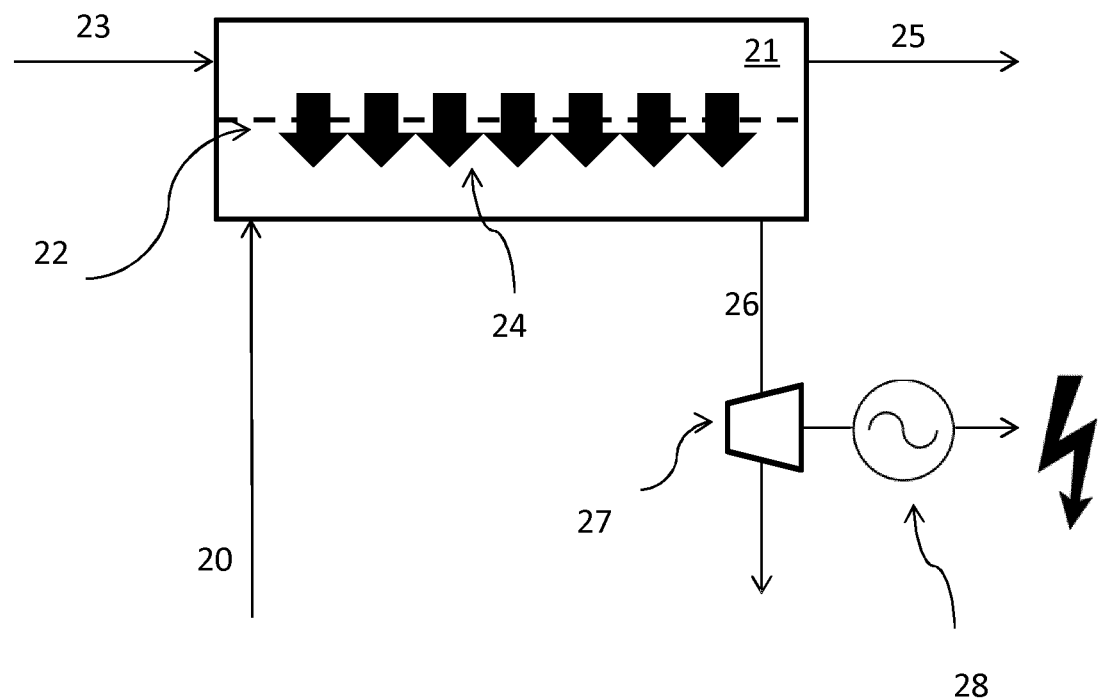
FIG. 6 shows an example osmotic power unit for use with the process of the present invention.

FIG. 6 shows more details of an osmotic power unit 7. A saline stream 20 extracted from a geothermal formation (which may for example be stream 1, 4 or 6 of FIG. 1) is passed to an osmosis unit 21 containing a semi-permeable membrane 22 which permits passage of water but not of salts, and flows at one side of membrane 22. An aqueous stream 23 which is of lower salinity than stream 20 enters osmosis unit 21 and flows at the other side of membrane 22. Arrows 24 show the direction of water transport by osmosis across membrane 22. An output stream 25 derived from original input stream 23 and now containing a higher concentration of salt, leaves osmosis unit 21. An output stream 26 consisting of original input stream 20 now containing a lower concentration of salt, leaves osmosis unit 21 via a turbine 27 which drives a generator 28 thus producing electricity.

Whilst the present invention has been described and illustrated with reference to particular embodiments, it will be appreciated by those of ordinary skill in the art that the invention lends itself to many different variations not specifically illustrated herein. By way of example only, certain possible variations will now be described. It will be appreciated that the pre-treatment steps described above are not essential, and the nature and number of pre-treatment steps required in any particular application will depend, at least in part, on the nature on the properties of the fluid extracted from the formation in question.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A process for the generation of power, the process comprising the steps of:
   extracting a warm saline stream from a first underground formation, the first underground formation being a geothermal formation,
   converting latent osmotic energy present in said stream into electricity by passage through an osmotic power unit in which said stream is passed over one side of a semi-permeable membrane which permits the passage of water but not the passage of salts, a low salinity stream derived from an aqueous feed stream being passed over another side of said membrane, and
   reducing a temperature of said warm saline stream before said stream enters the osmotic unit by passage through a thermal power unit in which thermal energy present in said stream is extracted,
   and wherein an output stream derived from said warm saline stream after passage through the osmotic power unit is injected into a second, different, underground formation wherein the second underground formation is an aquifer, the aquifer being a water-bearing stratum comprising permeable rock, sand, silt and/or gravel.

2. A process according to claim 1, wherein the method comprises extracting the aqueous feed stream from the second underground formation.

3. A process according to claim 1, wherein the aquifer is located in a region having a depth underground of between 50 m and 400 m.

4. A process according to claim 1 wherein water in the aquifer contains one or more contaminants that render the water unsuitable for use as drinking water.

5. A process according to claim 1, wherein the output stream derived from said low salinity stream after passage through the osmotic power unit is inserted into the first underground formation.

6. A process according to claim 1, wherein the output stream derived from said low salinity stream after passage through the osmotic power unit is inserted into a third, different, underground formation.

7. A process according to claim 1 wherein the thermal power unit provides heat extracted from the warm saline stream to a district heating system.

8. A process according to claim 1 wherein the thermal power unit converts the thermal energy present in the warm saline stream into electricity.

9. A process according to claim 1, in which the warm saline stream has a temperature of at least 45° C.

10. A process according to claim 1, in which the warm saline stream has a salt content of at least 10% wt.

11. A process according to claim 1, in which the aqueous feed stream has a salt content of less than 1% wt.

12. A process according to claim 1, comprising increasing a flow rate available from one of said underground formations by drilling non-vertically.

13. A process for the generation of power, the process comprising operating a first power generation system in accordance with claim 1, and operating a second power generation system in accordance with the process of claim 1, and wherein the first and second systems extract the aqueous feed stream from a same underground formation.

14. A process for the generation of power, the process comprising operating a first power generation system in accordance with the process of claim 1, and operating a second power generation system in accordance with the process of claim 1, and wherein a geothermal formation from which the second power generation system extracts the warm saline stream is the underground formation into which the first power generation system inserts the output stream derived from the warm saline stream after passage through the osmotic unit.

15. A process according to claim 1, wherein the method comprises extracting the aqueous feed stream from the second underground formation and wherein the output stream derived from said low salinity stream after passage through the osmotic power unit is inserted into the first underground formation.

16. A power generation system comprising:
a first inlet connection to a warm saline stream extracted from a first underground formation;
an osmotic power unit arranged to generate electricity using a difference in salinity between a high-salinity input stream and a low-salinity input stream,
a thermal power unit arranged to extract thermal energy from the warm saline stream thereby producing a cooled output stream; and
a first outlet connection to a second, different underground formation, the second underground formation being an aquifer, the aquifer being a water-bearing stratum comprising permeable rock, sand, silt and/or gravel,
and wherein the system is arranged such that the cooled output stream of the thermal power unit is passed to the osmotic power unit for use as the high-salinity input stream, and a waste stream derived from the high-salinity input stream following passage through the osmotic power unit is passed to the second underground formation via the first outlet.

17. A power generation system according to claim 16, further comprising:
a second inlet connection to an aqueous feed stream extracted from the second underground formation, and
a second outlet connection to the first underground formation,
and wherein the system is arranged such that the aqueous feed stream is passed to the osmotic power unit for use as the low-salinity feed stream, and the waste stream derived from the low-salinity input stream following passage through the osmotic power unit is passed to the first underground formation via the second outlet.

18. A power generation system comprising two or more power generation systems in accordance with claim 16, wherein the first inlet connection of a first power generation system is connected to the same underground formation as the first inlet connection of a second power generation system.

19. A process for the generation of power, the process comprising the steps of:
extracting a warm saline stream from a first underground formation, the first underground formation being a geothermal formation,
converting latent osmotic energy present in said stream into electricity by passage through an osmotic power unit in which said stream is passed over one side of a semi-permeable membrane which permits the passage of water but not the passage of salts, a low salinity stream derived from an aqueous feed stream being passed over another side of said membrane, and
reducing a temperature of said warm saline stream before said stream enters the osmotic unit by passage through a thermal power unit in which thermal energy present in said stream is extracted,
and wherein an output stream derived from said warm saline stream after passage through the osmotic power unit is injected into a second, different, underground formation; and
wherein the first underground formation is located in a first region, said first region extending between a first depth and a second depth, and the second underground formation is located in a second region, said second region extending between a third depth and a fourth depth, and the first depth is different to the third depth, and/or the second depth is different to the fourth depth.

* * * * *

UNITED STATES PATENT AND TRADEMARK OFFICE
CERTIFICATE OF CORRECTION

| | |
|---|---|
| PATENT NO. | : 11,231,020 B2 |
| APPLICATION NO. | : 16/630151 |
| DATED | : January 25, 2022 |
| INVENTOR(S) | : Steen Søndergaard Nissen |

It is certified that error appears in the above-identified patent and that said Letters Patent is hereby corrected as shown below:

In the Claims

1. In Column 15, Lines 35-36, in Claim 14, delete "the warm saline stream" and insert -- a warm saline stream --, therefor.
2. In Column 15, Line 37, in Claim 14, delete "the output stream" and insert -- an output stream --, therefor.

Signed and Sealed this
Twenty-second Day of November, 2022

*Katherine Kelly Vidal*

Katherine Kelly Vidal
*Director of the United States Patent and Trademark Office*